I. A. SIBLEY, Jr.
BUMPER FOR VEHICLES.
APPLICATION FILED MAY 16, 1921.
1,386,807.
Patented Aug. 9, 1921.
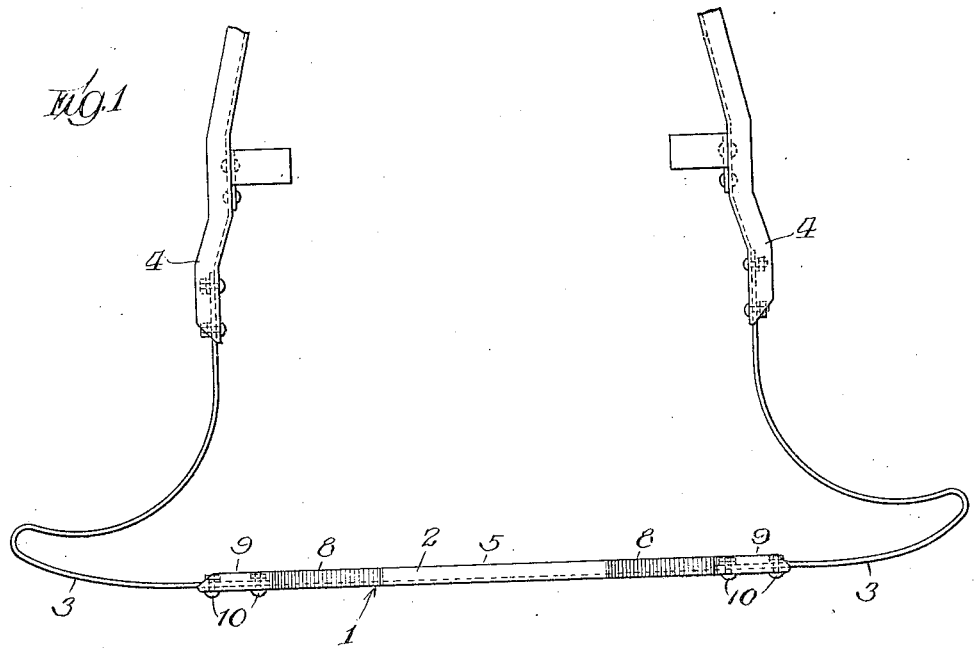
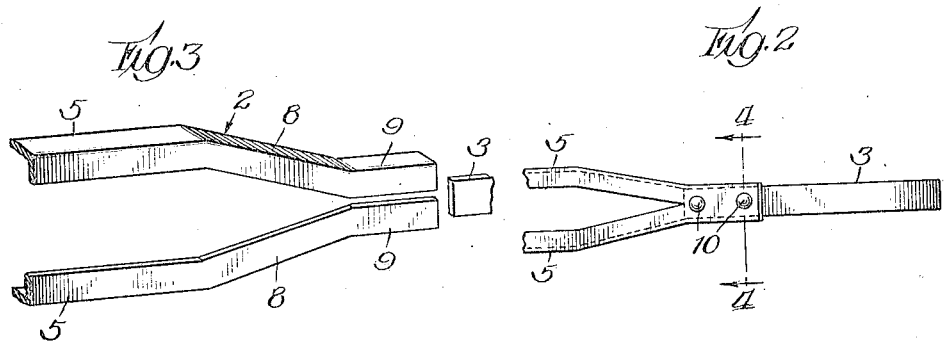
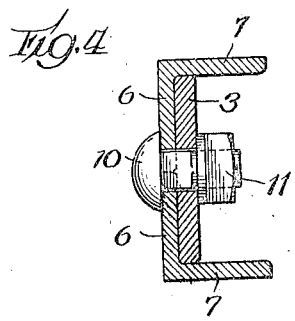
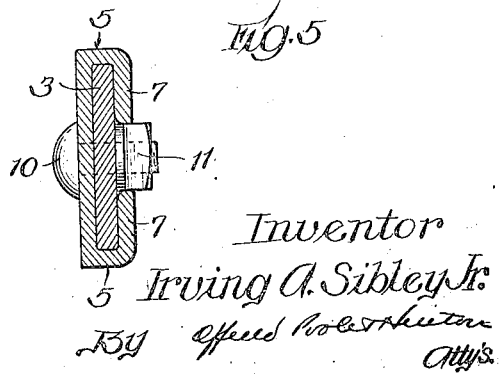
Inventor
Irving A. Sibley Jr.
By
Atty's.

UNITED STATES PATENT OFFICE.

IRVING A. SIBLEY, JR., OF CHICAGO, ILLINOIS.

BUMPER FOR VEHICLES.

1,386,807. Specification of Letters Patent. Patented Aug. 9, 1921.

Application filed May 16, 1921. Serial No. 469,754.

*To all whom it may concern:*

Be it known that I, IRVING A. SIBLEY, Jr., a citizen of the United States, and a resident of Chicago, in the county of Cook and State of Illinois, have invented certain new and useful Improvements in Bumpers for Vehicles, of which the following is a specification.

This invention relates to improvements in automobile bumpers, more particularly of that type of bumper characterized by the provision of a central impact section of increased vertical width intermediate the ends of the transverse impact member of the bumper.

The object of this invention is to provide a simple and practical construction for a bumper of the character hereto described, and further to provide a suitable method for forming the central impact section and connecting the ends of the same to resilient bars forming the end sections of the bumper which have direct connection or attachment with the frame members of the vehicle. The bumper structure, and the method of process involved is hereinafter fully set forth, and in connection with the accompanying drawings, in which—

Figure 1 is a top plan view of the bumper attaching brackets,

Fig. 2 is a view in front elevation of one-half of the bumper,

Fig. 3 is an enlarged detailed view in perspective, showing the method of constructing the central impact section, Fig. 4 is an enlarged detailed view in cross-section, taken on line 4—4 of Fig. 2, and Fig. 5 is a view similar to that of Fig. 4, showing a modified construction that may be resorted to if desired.

As clearly shown in Fig. 1, the bumper comprises in general parts as follows: An impact member 1 including a central impact section 2 connected at its ends with end sections 3—3 extending from the central section 2, and bent in U-shape to form the extremities of the impact member, and thence rearwardly and connected to brackets 4—4 adapted for direct connection with the frame members of the vehicle. The structure of the central impact section 2 preferably involves the use of angle bars shaped and otherwise treated to provide a wide impact area, as will hereinafter be set forth in detail, whereas the end sections 3—3 consist of single flat bars of inherent resilient qualities, which are attached to the ends of the central impact section 2. The use of angle bars in the construction of the central impact section introduces an element of rigidity and resistance to distortion under the shock of impact received against said section, whereas the end sections are considerably more resilient and therefore may be assumed to be the shock absorbing portions of the bumper, whereas the central impact section is comparatively non-resilient, and non-yieldable under impact.

Referring now to the structure of the impact section 2, and especially to the manner in which the parts are assembled and joined together, Fig. 3 illustrates the parts thereof during the process of manufacture, and prior to their final assembly. As hereinbefore suggested, the section 2 is made up of two angle bars 5—5; that is, bars which are L-shaped in cross-section, each having a vertical web 6 which form the impact faces of the section 2, and rearwardly extending horizontal webs 7—7 disposed along the outer edges of the individual bars 5—5. In their initial form the bars 5—5 may be considered as separate members, one of which ultimately forms the upper half of the impact section, and the other the lower half, the bar forming the upper half having its end portions bent to form a downwardly inclined portion 8, and a parallel offset end portion 9, whereas the bar forming the lower half has its end portions bent to form a corresponding upwardly inclined portion 8, and a horizontally offset end portion 9. In other words, two bars of equal length are formed so that their end portions converge and meet in edgewise contact throughout the end portions 9—9, thereby spacing the main portions of the bar vertically apart with the horizontal webs 7 disposed along the outermost edges. As a means of connecting the bars together to form a rigid open frame, the contacting or abutting edges of the bars throughout the end portions 9—9 are welded together, thus providing channel shaped ends having spaces between the transverse webs 7—7 substantially twice the vertical dimension of the two individual bars. As a preferable construction, however, the channel shaped ends of the central section 2 are reduced to a width slightly less than the combined vertical dimensions of the bars 5—5, this being accomplished by removing a portion of the metal along the contacting edges of the end portions 9—9 either by planing, grinding, or in any other suitable manner. The purpose of reducing the width of the channel shaped ends is to provide a snug fit between the ends of the impact section 2 and the adjacent ends of the end sections 3—3 which are inserted into the channel shaped ends of the impact section 2, as clearly shown in Figs. 2 and 4. As a means for joining the connected ends of the central impact section 2 and end sections 3—3 together, bolts 10 are inserted transversely through the interfitting portions, there being bolt holes punched in the bars prior to the assembly, these holes being so located that corresponding holes will register when the parts are fitted together, thus making the operation of assembly a comparatively simple one.

If desired, the final assembly of the central impact section 2 and the end sections 3—3 may be carried a further step by bending or swaging the rearwardly extending portions of the horizontal webs 7—7 over and downwardly upon the ends of the end sections 3—3 throughout the end portions of the impact section 2. In other words, the webs 7—7 are bent from the position shown in Fig. 4 to that shown in Fig. 5, and as manifest from the latter figure, the ends of the bars 3 are thus substantially surrounded by the angle bars 5, thus providing a stronger and more permanent connection between the parts. Furthermore, the parallel edges of the webs 7—7 bear against the faces of the nuts 11—11 of the bolts 10, thereby forming a lock preventing the same from being unscrewed and the bolts loosened. In this manner, the bolts have the same permanence of connection as a rivet would have, thus making the bumper a more unitary and integral structure throughout.

Having described a preferred embodiment of the invention, I claim as new and novel in the art to which the invention pertains:

1. A vehicle bumper comprising an impact member consisting of a central impact section, and end sections adapted for attachment to a vehicle frame, said central impact sections comprising bars spaced apart vertically and bent to form convergent end portions meeting in edgewise contact, and welded to unite said bars together.

2. A vehicle bumper comprising an impact member consisting of a central section, and end sections adapted for attachment to the vehicle, said central section being formed of bars spaced apart vertically intermediate their ends, and meeting in edgewise contact throughout their end portions, said end portions being welded together and secured to said end sections.

3. A vehicle bumper comprising an impact member consisting of a central impact section, end sections fixed to the ends of said central section and adapted for attachment to the vehicle said central section comprising angle bars spaced apart vertically with the transverse webs extending along the outer edges and having their ends bent to form converging end portions having abutting edgewise welded connection, thereby forming channel shaped members adapted to engage said end sections.

4. A vehicle bumper comprising an impact member consisting of a central impact section, and end sections adapted for attachment to a vehicle frame, said central impact sections comprising angle bars spaced apart vertically and bent to form convergent end portions welded together along the contacting edges of the vertical webs thereof, thereby forming channel shaped end portions adapted to engage the end sections, the transverse webs of said bars being bent over and upon said end sections.

5. A vehicle bumper comprising an impact member consisting of a central section, and end sections adapted for attachment to the vehicle, said central section being formed of angle bars spaced apart vertically intermediate their ends, and meeting in edgewise abutting contact throughout their ends, the abutting edges of said end portions being welded together to form channel shaped end portions adapted to receive said end sections.

6. A vehicle bumper comprising an impact member consisting of a central impact section, end sections fixed to the ends of said central section, and adapted for attachment to the vehicle, said central section comprising angle bars spaced apart vertically and their ends shaped to form edgewise abutting end portions adapted to be welded together, and forming channel shaped members into which the end sections are received, and bolts extending through the adjacent ends of the interfitting ends of said sections.

In witness whereof I hereunto subscribe my name this 13th day of May, A. D. 1921.

IRVING A. SIBLEY, Jr